(12) United States Patent
Milligan et al.

(10) Patent No.: US 9,161,609 B2
(45) Date of Patent: Oct. 20, 2015

(54) QUICK-RELEASE WEIGHT DISTRIBUTION AND CONNECTION SYSTEM

(71) Applicant: Ehmke Manufacturing, Inc., Philadelphia, PA (US)

(72) Inventors: Benjamin H. Milligan, Cherry Hill, NJ (US); Samuel Clifford Stokes, Moorestown, NJ (US)

(73) Assignee: Ehmke Manufacturing, Inc., Philadelphia, PA (US)

( * ) Notice: Subject to any disclaimer, the term of this patent is extended or adjusted under 35 U.S.C. 154(b) by 0 days.

(21) Appl. No.: 13/873,934

(22) Filed: Apr. 30, 2013

(65) Prior Publication Data

US 2013/0240588 A1     Sep. 19, 2013

Related U.S. Application Data

(63) Continuation of application No. PCT/US2011/059568, filed on Nov. 7, 2011.

(60) Provisional application No. 61/410,688, filed on Nov. 5, 2010.

(51) Int. Cl.
*A45F 3/06* (2006.01)
*A45F 3/10* (2006.01)
*A45F 3/04* (2006.01)
*B23P 19/04* (2006.01)

(52) U.S. Cl.
CPC . *A45F 3/10* (2013.01); *A45F 3/047* (2013.01); *A45F 3/06* (2013.01); *B23P 19/04* (2013.01); *Y10T 29/49815* (2015.01)

(58) Field of Classification Search
CPC ............. A45F 3/10; A45F 3/047; A45F 3/06; A45F 2003/025; A45F 2003/045
USPC .......... 224/580, 605, 636–637, 641, 262, 583
See application file for complete search history.

(56) References Cited

U.S. PATENT DOCUMENTS

| | | | | |
|---|---|---|---|---|
| 4,114,788 A | * | 9/1978 | Zufich | 224/153 |
| 4,318,502 A | * | 3/1982 | Lowe et al. | 224/153 |
| 5,429,287 A | * | 7/1995 | Frano | 224/640 |
| 5,806,741 A | * | 9/1998 | Kirk | 224/634 |
| 5,860,769 A | * | 1/1999 | Seligman | 405/186 |
| 5,954,253 A | * | 9/1999 | Swetish | 224/631 |
| 6,024,265 A | | 2/2000 | Clements | |
| 6,886,727 B2 | * | 5/2005 | Moore | 224/637 |
| 8,172,117 B2 | * | 5/2012 | Maggi | 224/634 |
| 8,336,171 B2 | * | 12/2012 | Colorado | 24/3.7 |
| 8,459,518 B2 | * | 6/2013 | Demsky | 224/576 |

(Continued)

FOREIGN PATENT DOCUMENTS

EP     0638262 A1     2/1995

OTHER PUBLICATIONS

Merriam-Webster Online Dictionary entry for "receive." Accessed on Jun. 11, 2014.*

*Primary Examiner* — Justin Larson
*Assistant Examiner* — Scott McNurlen
(74) *Attorney, Agent, or Firm* — Barley Snyder (57) ABSTRACT

Provided are a device, system, and method for distributing a weighted load carried by an operator to a waist-belt worn by the operator, and a quick-release feature for quickly discarding and separating a portion of a load from a waist belt and/or accessories on the belt.

10 Claims, 7 Drawing Sheets

(56) References Cited

U.S. PATENT DOCUMENTS

| | | |
|---|---|---|
| 8,490,212 B1 * | 7/2013 | Asher et al. .................. 2/2.5 |
| 2006/0138188 A1 | 6/2006 | Kramer |
| 2006/0283907 A1 * | 12/2006 | Green et al. .................. 224/637 |
| 2007/0152007 A1 * | 7/2007 | Kauss et al. .................. 224/637 |
| 2008/0257928 A1 * | 10/2008 | Lowry et al. .................. 224/638 |
| 2008/0302839 A1 | 12/2008 | Murdoch et al. |
| 2009/0071990 A1 * | 3/2009 | Jardine et al. .................. 224/155 |
| 2012/0000948 A1 | 1/2012 | Maggi |
| 2012/0018479 A1 | 1/2012 | Thibadeau, Jr. et al. |

* cited by examiner

QUICK-RELEASE WEIGHT DISTRIBUTION AND CONNECTION SYSTEM

CROSS-REFERENCE TO RELATED APPLICATIONS

This application is a continuation of PCT International Application No. PCT/US2011/059568 filed Nov. 7, 2011, which claims priority under 35 U.S.C. §119 to U.S. Provisional Application No. 61/410,688, filed Nov. 5, 2010.

FIELD OF THE INVENTION

The invention relates to a device, system, and method for quick, reversible detachment of an attached load-bearing component from a weight distribution system.

BACKGROUND

Load bearing articles, such as backpacks, are used by individuals of all ages and in all manner of situations, from students carrying school supplies, to hikers carrying camping supplies, to soldiers carrying tactical equipment. Backpacks increase the amount of weight that can be comfortably handled by the operator by shifting the weight of the load from the hands and arms to the shoulders, with the added benefit of freeing up the arms in the process. Improvements upon the basic backpack design include, among other things, displacement of weight from the shoulders to the hips through a variety of systems and devices.

The ability to quickly remove one's backpack can be of critical importance in certain situations. Specifically, in combat situations, the ability to quickly free one's self from the encumbrances of a heavy pack can mean the difference between life and death. Common backpacks and rucksacks come equipped with a variety of attachment mechanisms to maintain the pack's attachment to the operator's body. Larger and more complicated backpack systems provide a greater total carrying capacity, however they are also of limited use in situations where speed of removal is important. Further, should an operator decide to lighten his load, the pack must be removed entirely so that a determination may be made as to which items should remain and which should not.

As a result, until the present invention there has remained a need in the art for a quick-release weight distribution device, system, and method, which permits the carrying of a shoulder-borne or other load component, yet also provides the ability to quickly release all or a portion of the load at a moment's notice, even under high-stress conditions.

SUMMARY

The present invention is directed to a quick-release weight distribution and connection device, system, and method for distributing the weight of and quickly releasing a shoulder-borne or other load carried by an individual, such as, for example, in a backpack or rucksack, tactical vest, or body armor.

In one embodiment, the quick-release weight distribution device has a load-bearing component that connects to a waist-belt via an interconnection member and a quick-disconnect mechanism. The load-bearing device and interconnection member thus remain affixed to one another while being disconnected from the waist-belt.

In one embodiment, the quick-release weight distribution system is operably configured for distributing a load from a load-bearing component to a waist-belt, further permitting the reversible attachment of the load bearing component to the waist-belt via an interconnection member and quick-disconnect attachment mechanism, such that the load-bearing component and interconnection member may be quickly disconnected and discarded while the waist-belt remains in use. A portion of the load of the load-bearing component is transferred to an interconnection member via a weight-transfer nexus, which also serves as a connection between the load-bearing component and the interconnection member. The interconnection member provides a transfer of a portion of the load to the waist-belt via insertion into sleeve system of the waist-belt and engagement of a quick-disconnect mechanism located on the waist-belt.

In operation, the load of the load-bearing component is transferred through the weight-transfer nexus to the interconnection member, and then from the interconnection member to the waist-belt. The result is weight transfer; with a portion of the load previously borne by the load-bearing component now borne by the waist-belt. Further, in operation, the quick-disconnect mechanism of the system provides the functionality of quickly removing a portion of the system by reversible disengagement of the interconnection member from the waist-belt. As such, the system provides a quick-disconnecting load-bearing component and interconnection member to the waist-belt, thus discharging the load of the load-bearing component from the waist-belt, without requiring removal or interruption of usage of the waist-belt.

Also provided are a method of quickly attaching a load-bearing component and an interconnection member to a waist-belt and a method of quickly-releasing a load-bearing component and interconnection member from a waist-belt while maintaining the connection between the load-bearing component and interconnection member.

Additional objects, advantages and novel features of the invention will be set forth in part in the description, examples and figures which follow, and in part will become apparent to those skilled in the art on examination of the following, or may be learned by practice of the invention.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION OF THE EMBODIMENT(S)

For the purposes of this disclosure, the term "load-bearing component" means any device or article, such as a pack, a rucksack, a tactical vest, military pack, backpack, MOLLE-compatible gear, body armor, or other similarly-suited load-carrying gear designed to provide storage compartments or accept the attachment of accessories, and configured to be worn over one or both shoulders of a operator. The term "MOLLE" refers to Modular Lightweight Load-carrying Equipment (MOLLE), which is commonly used for tactical gear, body armor, and other accessories by the Unites States armed forces.

The term "load" means any item or items, and/or the weight of any item or items, stored in and/or on the load-bearing component, including but not limited to items placed in a storage compartment of the load-bearing component, as well as any accessories stored in or attached to the load-bearing component via attachment mechanisms known in the art. Such mechanisms include, for example, the MOLLE attachment system, or other clips, buckles, and ties. The term "accessories" includes, but is not limited to, munitions pouches, water bottles, electronics equipment, ammunition and firearms.

The term "shoulder harness" means any mechanism or device for attaching the load-bearing gear to the body of an operator, specifically to the operator's shoulders (i.e., shoulder-borne), including, but not limited to a strap feature of a backpack or rucksack, or a harness feature, or other suitable features for securing a load-bearing gear to the body of the operator. Further, "shoulder harness" encompasses mechanisms and devices employing a single strap to attach the load-bearing gear to the body of the operator, as well as those mechanisms and devices which employ more than one strap to attach the load-bearing gear, e.g., typically two shoulder straps.

Throughout the application, the term "operator" means the individual wearing the quick-release weight distribution waist-belt and interconnection device or system. However, it is understood that the operation of the system and participation in the method may be undertaken by an individual to whom the quick-release weight distribution waist-belt is not attached, but who is in very close proximity to the individual wearing same. Therefore, as applied to the system and the method, the term "operator" is not so limited, but may include any other individual operating the device or system in close proximity to the wearer, such as a comrade assisting an injured individual by quickly releasing the load from the wearer.

The term "waist-belt" means a broad, flexible band or article of clothing, worn around the waist, to gird or encircle the operator, confine some part of one's wardrobe, and/or to support various articles of use or ornament, such as tools or weapons.

The term "interconnection member" means an article designed to provide a connection between the load-bearing component and the waist-belt and to provide a redistribution of weight from the load-bearing component to the waist-belt.

The term "quick" means between 0.1 and 2.0 seconds, preferably between 0.1 and 1.0 second.

Quick-Release Weight Distribution Belt

Figure 1:
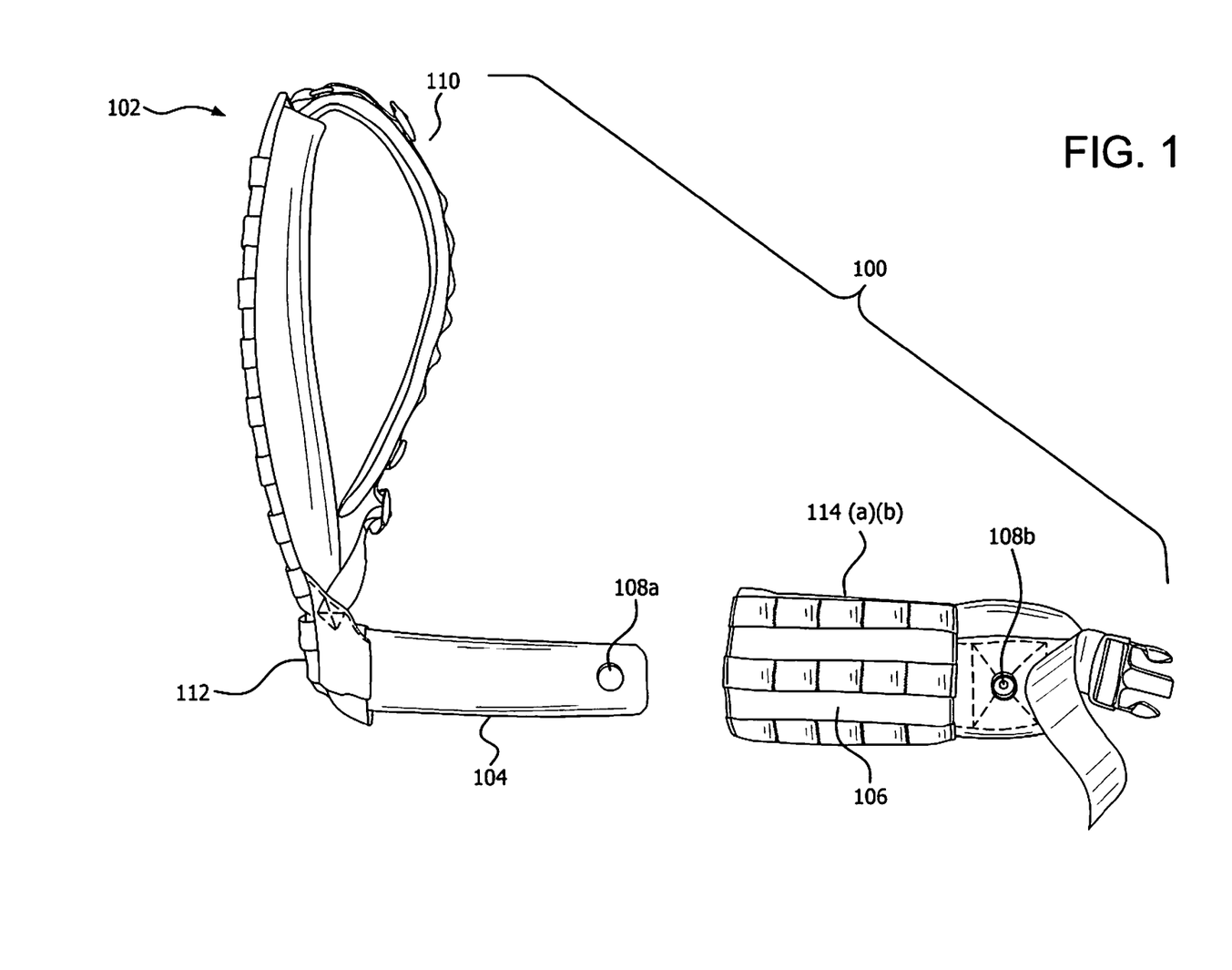
FIG. 1 shows a partially exploded Quick-Release Weight Distribution System, with the load bearing component being a backpack attached to the interconnection member, apart from the waist-belt.

Shown in FIG. 1 is one exemplary embodiment of the quick-release weight distribution belt 100 of the present invention. Quick release weight distribution belt 100 has load-bearing component 102, interconnection member 104, waist-belt 106, quick disconnect attachment mechanism 108, and a pair of sleeves 114a and 114b.

Load-bearing component 102, interconnection member 104, waist-belt 106, and sleeves 114a and 114b are constructed from any one or more of a variety of flexible or inflexible materials, or a plurality of such materials. Such materials include, but are not limited to, leather, suede, cloth, cordura, denier-treated cordura, nylon, KEVLAR®, GORE-TEX®, cotton, polyester, or other natural or synthetic fibers, textiles, or polymers or any combination thereof. The tensile strength of the suitable materials can be varied, depending on the desired characteristics of, for example, the interconnection member, specifically, stiffness, strength, water resistance, or other factors, such as flame retardedness. Flexible materials can be stiffened or made more rigid and less flexible by inclusion or accompaniment of semi-rigid material(s), such as a foam, plastic or polymer, such as polyethylene or polyvinyl chloride solids, and fixing its location by suitable means, such as by sewing, gluing, spray adhesion, or fusing such material(s) in the desired location. However, it is contemplated that other methods of imparting rigidity could also be employed, such as applying an adhesive at the specified location, or by other methods well known to those skilled in the art.

The quick-release weight-distribution belt is configured to permit disengagement of quick-disconnect attachment mechanism 108, resulting in a detachment of load-bearing component 102 and interconnection member 104 from waist-belt 106. The quick-release weight-distribution belt thus permits the discarding of disengaged load-bearing component 102 and interconnection member 104, without requiring the removal or interrupted use of waist-belt 106 and any attachments connected thereto.

As embodied, load-bearing component 102 has two ends, a top end having shoulder harness 110, and weight distributing end 112. Load-bearing component 102 also has two sides, a body-side and an outward-side. When load-bearing component 102 is worn by an operator, body-side is located proximal to the operator's body and outward-side is located distal to the operator's body. When shoulder-borne, load-bearing component 102 also has at least one shoulder harness 110.

Also as embodied, interconnection member 104 is constructed from any one of a variety of materials, or a plurality of such materials, known by those skilled in the art to be suitable for the purpose of connecting load-bearing component 102 to waist-belt 106 and transferring weight from such a load-bearing component 102 to waist-belt 106.

Figure 2:
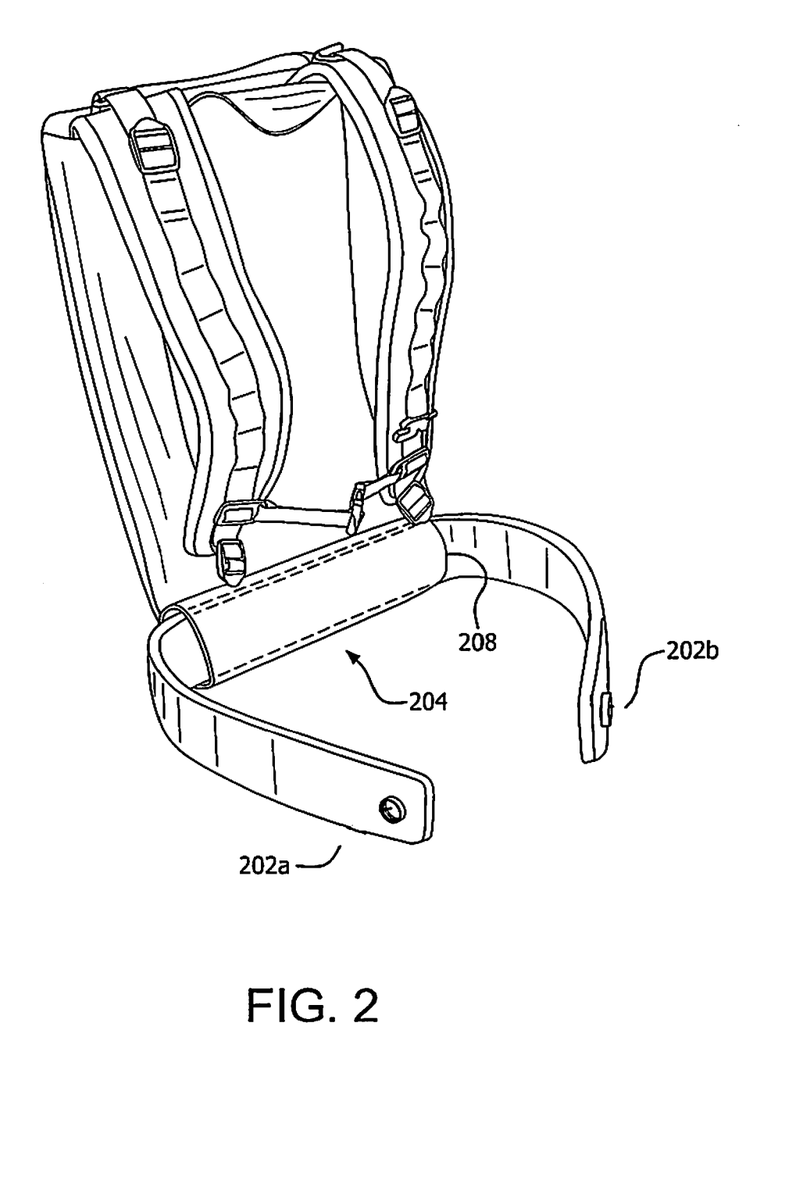
FIG. 2 shows a front view of the load-bearing component and interconnection member.

As embodied in FIG. 2, interconnection member 104 has two wing-ends: first wing-end 202a and second wing-end 202b. Also as, shown in FIG. 2, interconnection member 104 is constructed to encompass connector section 204 located between wing-ends 104a and 104b.

In operational use of such an embodiment, wing-ends 202a and 202b of the interconnection member engage waist-belt 106 via sleeves 114a and 114b and quick-disconnect mechanisms 108a and 108b. When interconnection member 104 is simultaneously attached to waist-belt 106 and load-bearing component 102, interconnection member 104 acts to redistribute the weight of load-bearing component 102 to waist-belt 106.

In one embodiment, the load-bearing component 102 is integrated as part of interconnection member 104, such that interconnection member 104 and load-bearing component 102 operate as a single unit. Alternatively, load-bearing component 102 is configured for reversible attachment to interconnection member 104 via a suitable coupling mechanism, such as coupling mechanism 208, as depicted in FIG. 2.

In embodiments where load-bearing component 102 is configured for reversible attachment to interconnection member 104, weight-distributing end 112 of load-bearing component 102 includes coupling mechanism 208. In one such embodiment, coupling mechanism 208 is any one of a number of mechanisms well-known to those skilled in the art, including, but not limited to, pivots, joints, clips, buckles, fasteners, mated fasteners, screws, vices and other hardware. In further embodiments, coupling mechanism is an attachment means such as VELCRO® or other adhesive means, such as glue or bonding or by heat molding. In yet further embodiments, coupling mechanism 208 is a sleeve configured to accept insertion of interconnection member 104.

In one embodiment, coupling mechanism 208 includes an articulating connector which is affixed between interconnection member 104 and load-bearing component 102 for articulated movement of load-bearing component 102 relative to interconnection member 104. The articulating connector permits movement of load-bearing component 102 relative to interconnection member 104 about a tilt axis, and alternatively around a pivot point.

In one embodiment, coupling mechanism 208 is one or more screws, or other suitable means for securing a frame of load-bearing component 102 to interconnection member 104. In another embodiment, coupling mechanism 208 is a suspension system, wherein a hub connects the load-bearing component to the interconnection member, such that the hub is adapted to pivot around a horizontal axis. To allow the hub to pivot horizontally, the hub is preferably constructed of two members mated together with a pin, which allows pivoting of said two members around a longitudinal axis of the pin. The pin is preferably slip fitted to provide rotation of the hub around the pin.

As additional embodiments of coupling mechanism 208 are envisioned by one skilled in the art, the present invention is not limited to the coupling mechanisms enumerated above, but would include any currently known coupling mechanisms or as yet to be designed coupling mechanisms.

Because interconnection member 104 is configured to reversibly attach to waist-belt 106 via a quick-release mechanism, the interconnection member is, therefore, of a width and length equal to or preferably less than the size of waist-belt 106. If the interconnection member were larger, the designated sections of the interconnection member could not fit within the one or more sleeves 114 affixed to the waist belt, as will be described in greater detail below.

In one embodiment, interconnection member 104 contains, in-part, a stiffened portion, such as being constructed to include a stiff material or materials, such as high-density polyethylene, foam, plastics or polymers, including PVC, or other inflexible material for imparting rigidity to the interconnection member. In this embodiment, a portion of interconnection member 104 remains flexible to allow interconnection member 104 to be guided into position within sleeves 114 of waist-belt 106.

Figure 3:
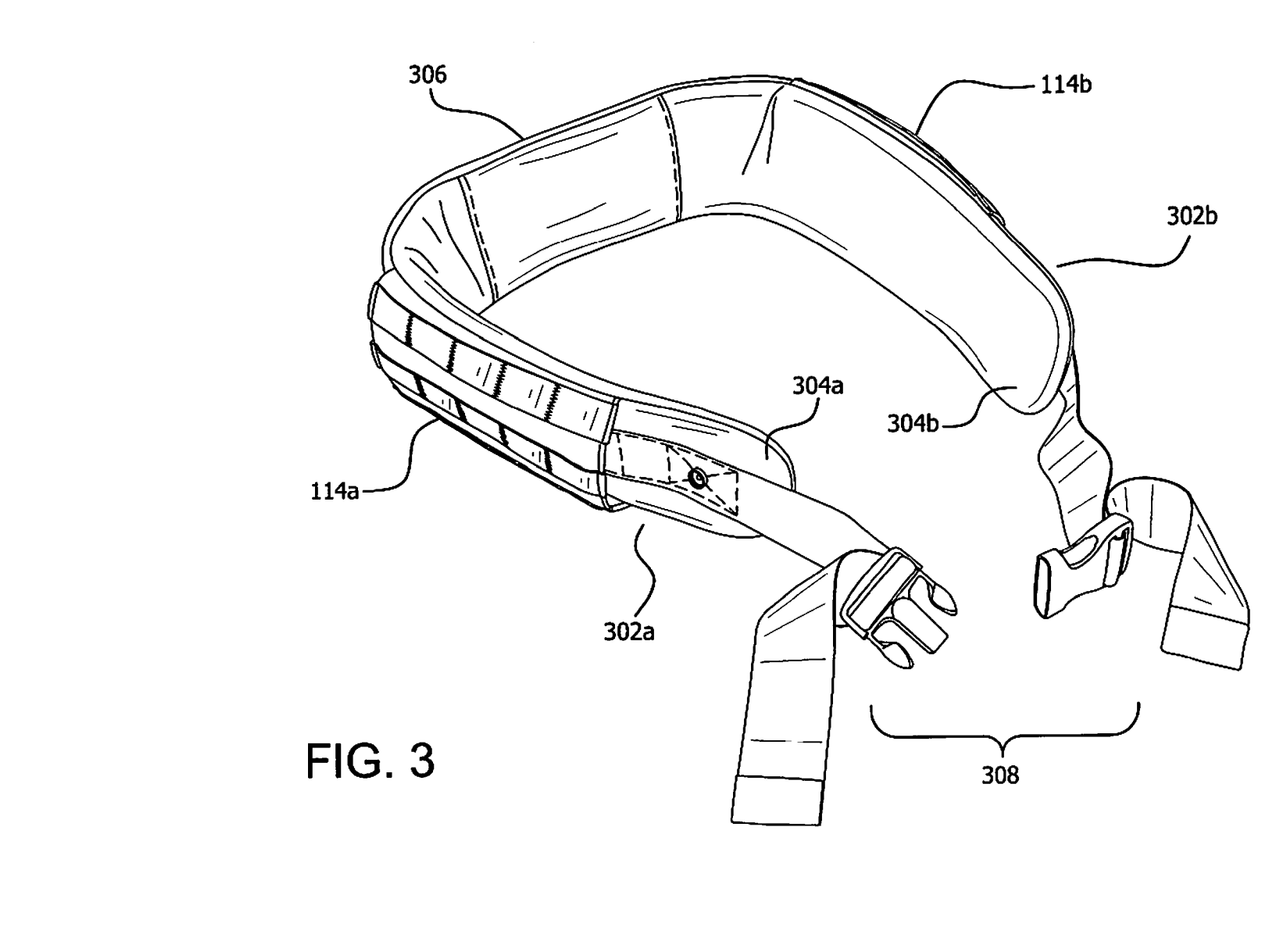
FIG. 3 shows a front view of the waist-belt.

Shown in FIG. 3 is an exemplary overview of an embodiment of waist-belt 106 of the present invention. In this embodiment, waist-belt 106 has at least two arms, first arm 302a and second arm 302b. First arm 302a terminates in first belt end 304a; second arm 302b terminates in second belt end 304b. Waist-belt has central section 306, located between the first and second arms. Waist-belt 106 further has closure device 308 for reversibly securing first belt end 304a and second belt end 304b to one another, thereby operationally forming a closed loop, such as when worn by an operator of the present invention.

Waist-belt 106 also has two sides, an operator side and an exterior side. Consequently when closed, looped waist-belt 106 is operationally worn around the operator's waist, the operator-side forms the interior of the loop and is located proximal to the operator's body. Similarly, when worn, the exterior side of waist-belt 106 is distal to the operator's body. Moreover, in at least one embodiment, waist-belt 106 is adjustable in length, making it adaptable to securely fit around the waist of the operator.

In one embodiment, affixed to waist-belt 106 are at least two sleeves 114: first sleeve 114a located on first arm 302a and second sleeve 114b located on second arm 302b. Sleeves 114a and 114b serve to house and secure at least a portion of interconnection member 104 to waist-belt 106. Sleeves 114a and 114b are constructed of an elongated overlay, such as a fabric overlay, that is positioned along an exterior surface of waist-belt, forming an opening or a channel between the exterior surface of waist-belt and the inner surface of the overlay (i.e., the side of the overlay facing the belt). The terms "overlay" and "sleeve" are used interchangeably herein. The overlay is secured to waist-belt 106, such as along an upper and lower edge of waist-belt 106, but is open at each end, so that the channel formed by the overlay is unobstructed. As a result, the overlay is parallel with the surface of waist-belt, and extends from central section 306 of waist-belt 106 to respective belt-ends 304a and 304b.

In practice, each sleeve has two ends: a central end and a terminal end. When affixed, central ends of each sleeve channel is proximal to central section 306 of waist-belt 106 and each sleeve is used to receive the corresponding inserted end of interconnection member 104 in a direction parallel to waist-belt 106, with the end of each wing of the interconnecting member entering the sleeve in a direction pointing toward respective belt-end 304a or 304b. In operation, the terminal ends of sleeves 114 are adjacent to respective belt ends 304a and 304b.

Figure 4:
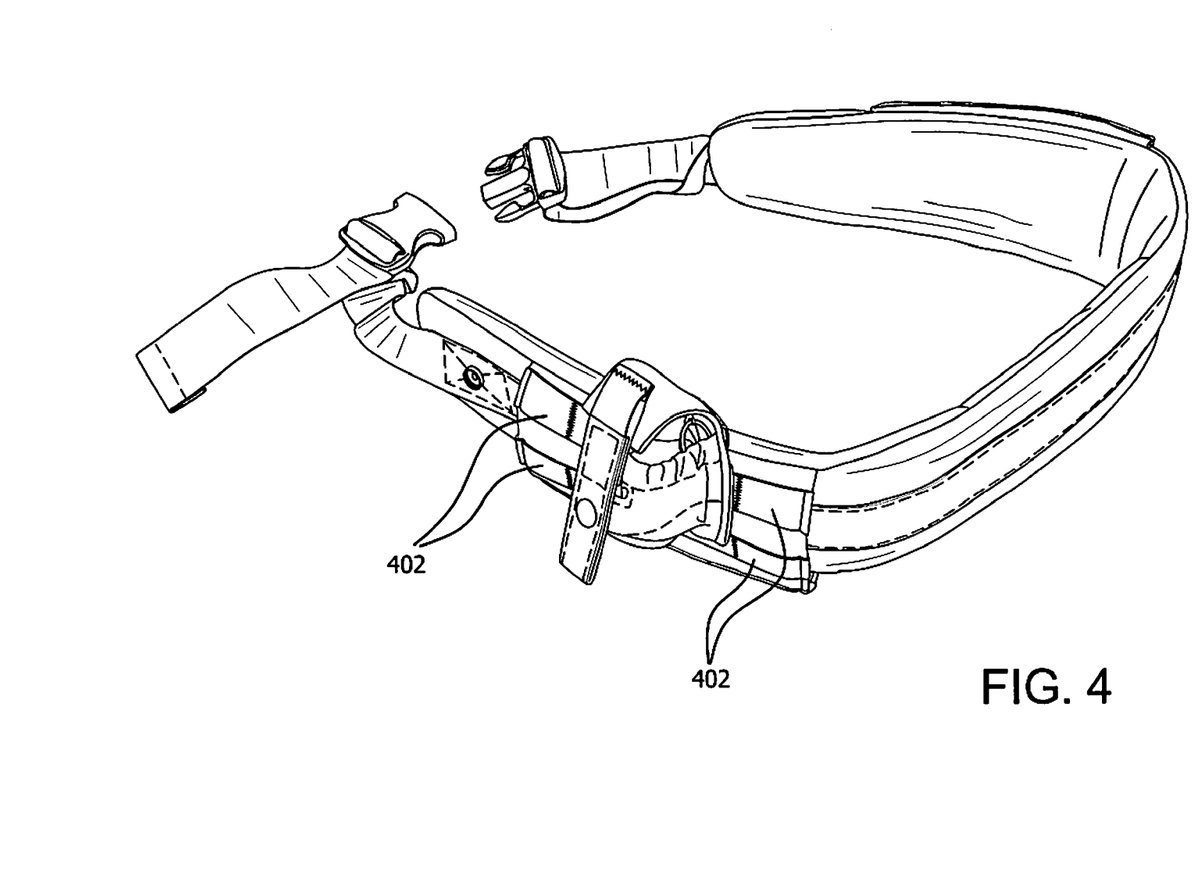
FIG. 4 shows a rear view of the waist-belt and sleeves, were the sleeves are configured with MOLLE-webbing, and an exemplary MOLLE-compatible grenade pouch attached to the waist-belt.
Figure 5:
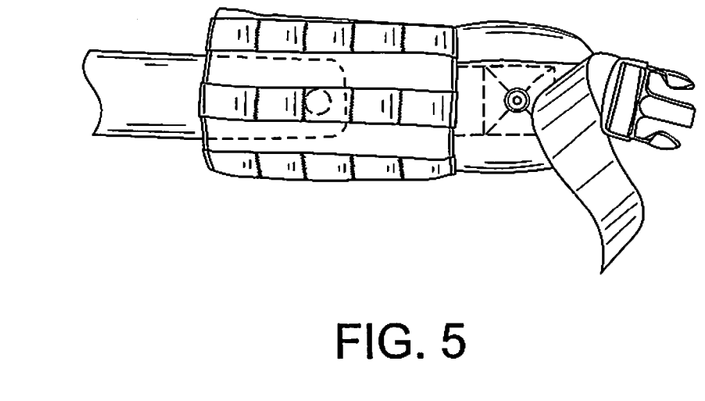
FIG. 5 shows a side view of the waist-belt, illustrating the manner of inserting the end of the interconnection member into the sleeves of the waist-belt.

In one embodiment the terminal ends of sleeves 114 remain open for access to interconnection member 104 and attachment of interconnection member to waist-belt via the connection means. In an alternative embodiment, the terminal ends of both sleeves 114 are closed, thereby covering an end portion of interconnection member 104 residing in the sleeve. The closed sleeves, as provided in certain embodiments, are each configured to include a mated part of quick-disconnect attachment mechanism 108 at the terminal end of each sleeve. As a result, once interconnection member 104 has been fully inserted into closed sleeve 114, quick-disconnect attachment mechanism 108 automatically engages, reversibly attaching interconnection member 104 to waist-belt In at least one embodiment, sleeves 114 are equipped with one or more modular expansion mechanism(s) 402 to allow detachable connection of items to waist-belt 106. These include, but are not limited to, pouches, holsters, storage cases, and/or water bottles, or other accessories. In such embodiments, modular expansion mechanism 402 is selected from one or more of MOLLE-webbing, buckles, VELCRO®, or other suitable connection means.

In one embodiment, the sleeve provides the stiffness of interconnection member 104 to stiffen the entire waist-belt.

Waist-belt 106 is configured with a release means for reversibly attaching the interconnection member to the waist-belt 106.

In one embodiment, waist-belt 106 is a padded utility waist-belt including a closure device 308 such as buckles or straps, with mated closure parts located on respective first and second belt ends 304a and 304b. In further embodiments, waist-belt 106 is configured with one or more various storage compartments for carrying and storing items and accessories on the waist-belt.

Quick-release weight distribution belt 100 has at least two quick-disconnect attachment mechanisms 108. Preferably two quick-disconnect attachment mechanisms 108 are provided to permit the most rapid release of the load in a single step when the operator can use both hands to simultaneously release both quick-disconnect attachment mechanisms.

Figure 6:
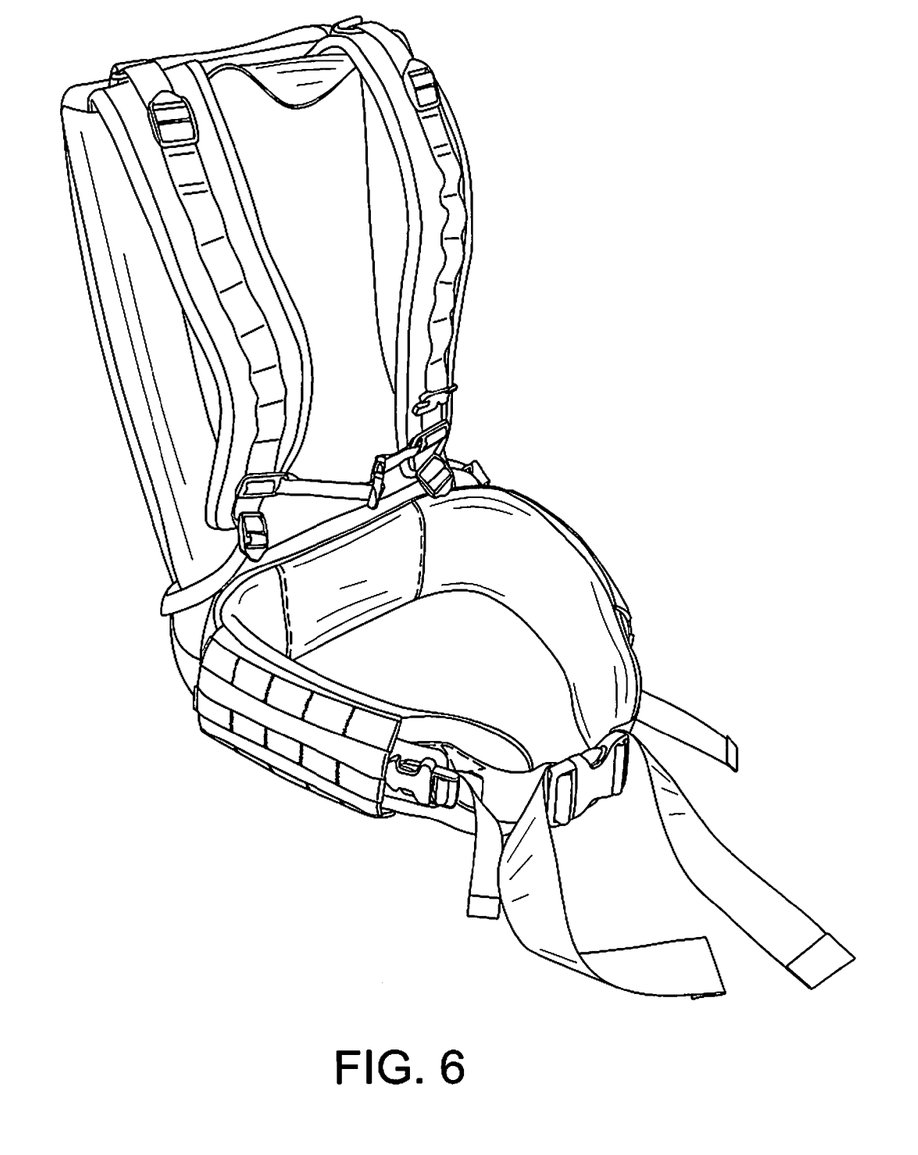
FIG. 6 shows a front view of an operably connected Quick-Release Weight Distribution System with a buckle as a quick-disconnect mechanism.
Figure 7:
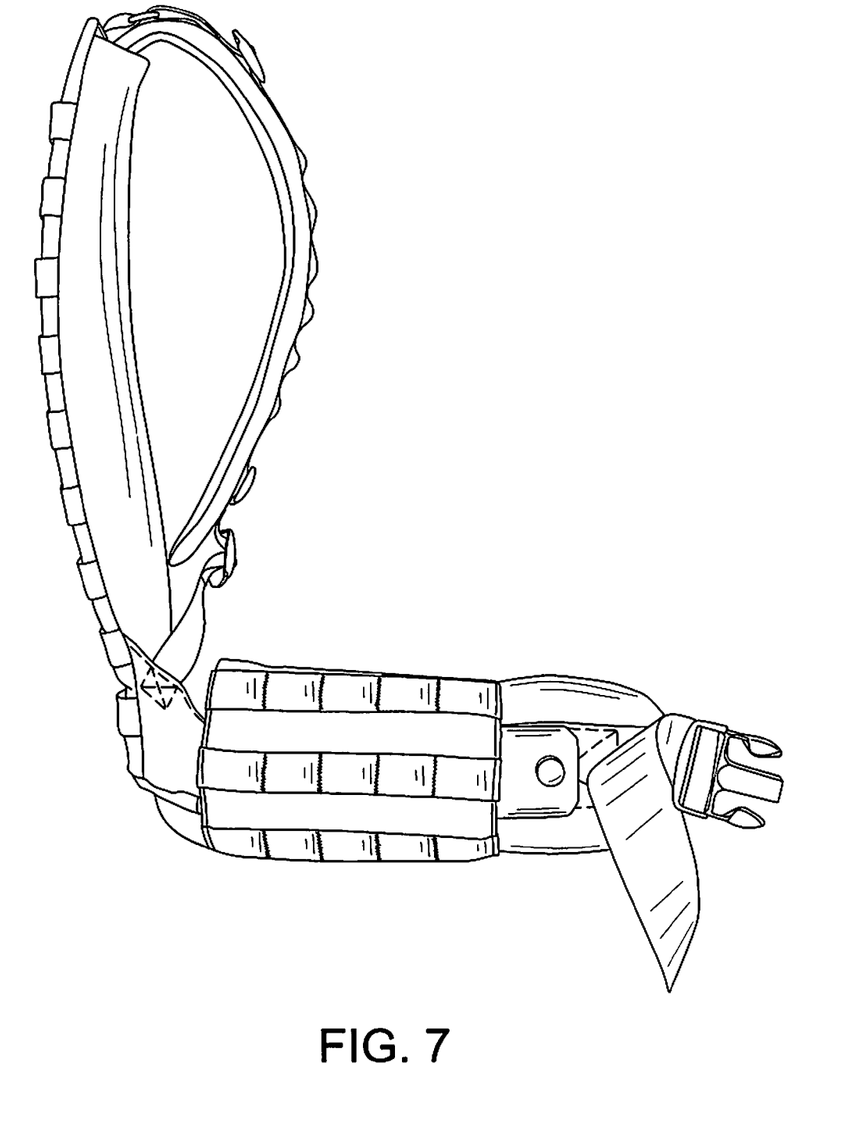
FIG. 7 shows a side view of an operably connected Quick-Release Weight Distribution System with a snap member and a quick-disconnect mechanism.

Each quick-disconnect attachment mechanism 108 is any one of a number of mechanisms known to those skilled in the art configured for rapid release and safely bearing the load transferred to waist-belt 106 from load-bearing component 102, including but not limited to a snap member as shown in FIGS. 1-5 and 7, or buckles as shown in FIG. 6. Quick-disconnect attachment mechanisms 108 are configured in at least two parts: retained part 108b and released part 108a. Retained part 108b of the first quick disconnect attachment mechanism 108 is affixed to first arm 302a of waist-belt 106 at a location between the first end of the waist-belt and terminal end of first sleeve 114a. Released part 108a of first quick disconnect attachment mechanism 108 is attached to first quick-release end 202a of interconnection member 104.

Retained part 108b of the second quick disconnect attachment mechanism 108 is affixed to second arm 302b of waist-belt 106 at a location between the second end of waist-belt and terminal end of second sleeve 114b. Released part 108a of the second quick disconnect attachment mechanism 108 is attached to second quick-release end 202b of interconnection member 104.

In one embodiment, first retained part 108b and second retained part 108b are further configured for mated releasable engagement with one another. When so embodied, and when worn by an operator, interconnection member 104 functions as an interface between the operator and the load carried by the operator, independent of waist-belt 106.

Exemplary Quick-Release Weight Distribution Belt

In the exemplified embodiment, load-bearing component 102 is a MOLLE-compatible rucksack with a modular frame and two shoulder straps, although one skilled in the art would know that similarly constructed backpacks and other shoulder-borne load-bearing components are also enabled to operate in the same way. The rucksack has a sleeve at the bottom which serves as coupling mechanism 208 and provides a means for insertion of interconnection member 104, thus reversibly connecting the two. Interconnection member 104 is constructed of one or more inner stiffening material(s), such as PVC, and is covered by an outer layer of flexible material. The male portion of a quick-release attachment mechanism is attached to each end of interconnection member 104 and oriented to be inserted into a complementary female portion of the quick-release attachment mechanism 108. Each female portion is mounted on waist-belt 106 at a location between the buckle and the terminal end of each sleeve. Waist-belt 106 is a MOLLE-compatible waist-belt, configured with two open-ended sleeves 114 located at external positions on waist-belt 106 such that, when waist-belt 106 is operably worn, sleeves 114 are located on the operator's hips, with the openings of sleeves 114 oriented at the operator's front and back. See FIG. 7. In alternative embodiments, the male and female components of the mechanisms are reversed, but attached and mated as described above.

Quick Release Weight Distribution System

In the embodied system an interface is provided in the form of interconnection member 104. The interface functions to transfer the weight of the load from the wearer's shoulders and back to the wearer's hips, as disclose above. When operably connected, weight-distributing end 112 of load-bearing component 102 transfers a portion of the load of load-bearing component 102 to interconnection member 104 via the weight-transfer nexus. As above, the weight-transfer nexus is one of any number of load-transferring connection systems known to those skilled in the art, including, but not limited to joints, pivots, and sleeves with mated insertable members. In one embodiment, the weight transfer nexus is coupling mechanism 208.

Sleeves 114a and 114b are operably configured to guide the inserting and orienting of wing-ends 202a and 202b to permit aligning of interconnection member 104 with waist-belt 106. When interconnection member 104 and waist-belt 106 are properly aligned, complementary parts 108a and 108b of quick-disconnect attachment mechanism 108 are positioned adjacent to one another. When parts 108a and 108b of quick-disconnect mechanism 108 are operably connected, quick-disconnect mechanism 108, in conjunction with sleeves 114a and 114b, provides for a transfer of a portion of the load of load-bearing component 102 to be transferred through interconnection member 104 to waist-belt 106. See FIG. 5. Quick-disconnect mechanism 108 is operably configured to permit the rapid connecting and disconnecting of interconnection member 104 from waist-belt 106.

In one embodiment of this system, waist-belt 106 has modular expansion mechanism 402 configured for attaching accessories to waist-belt 106. In one embodiment, modular expansion mechanism 402 is configured to overlay sleeves 114a and 114b. In another embodiment of the system, modular expansion mechanism 402 is independent of sleeves 114a and 114b. See FIG. 4.

In operation to connect the system, first quick-release end 202a of interconnection member 104 is inserted into central end of first sleeve 114a and pushed within the sleeve interior of first sleeve 114a until first quick-release end 202a of interconnection member 104 reaches a desired point along the terminal end of the sleeve. Released part 108a of first quick disconnect attachment mechanism 108 reversibly engages retained part 108b of first quick disconnect attachment mechanism 108. Sequentially or simultaneously, second quick-release end 202b of interconnection member 104 is inserted into the central end of second sleeve 114b and pushed within the sleeve interior of second sleeve 114b until second quick-release end 202b of interconnection member 104 reaches a desired point along the terminal end of the sleeve. Released part 108a of second quick disconnect attachment mechanism 108 reversibly engages retained part 108b of second quick disconnect attachment mechanism 108. Together, when both quick disconnect attachment mechanisms are engaged, the system securely holds the interconnection member to the weight belt.

Exemplary Quick-Release Weight Distribution System

In the exemplified system, waist-belt 106 is a MOLLE-compatible waist-belt configured with a closure buckle. Waist-belt 106 also is configured with two sleeves 114a and 114b and two mated parts of a quick disconnect attachment mechanism 108, each mounted on waist-belt 106 between the terminal end of each sleeve 114 and the closure buckle. Sleeves 114 of waist-belt 106 are configured to be MOLLE-compatible, allowing for holsters, pouches, or the like to be mounted on sleeves 114a and 114b. Load-bearing component 102 is a MOLLE-compatible rucksack, although as above, backpacks and other carriers for loads are also herein enabled. Weight-transfer nexus is a sleeve, mounted on weight-transfer end 110 of load-bearing component 102, and configured to accept insertion of interconnection member 104. Interconnection member 104 is constructed of PVC, but flexible enough to be wrapped around an operator's waist. Two parts of a quick disconnect attachment mechanism 108, complementarily mated to the quick-disconnect parts mounted on waist-belt 106, are mounted on interconnection member 104. See FIG. 1 and FIG. 6.

Methods Of Quickly Attaching And Releasing A Load-Bearing Component

An exemplified method is disclosed for quickly attaching a load which is initially borne by a load-bearing component. Upon completion of the method, the load is securely borne by the load-bearing component via an interconnection member, and a waist-belt. The method of quickly attaching a load-bearing component includes at least the following steps: inserting at least one interconnection member into a sleeve, aligning complementary parts of a quick-disconnect mechanism, and engaging at least one quick-disconnect mechanism, as is described above for connecting the quick release weight distribution system using a quick-release weight distribution device.

In one embodiment, the method includes the step of simultaneously inserting a first wing-end 202a of interconnection member 104, attached to load-bearing component 102, into a first sleeve 114a of waist-belt 106, while also inserting a second wing-end 202b of interconnection member 104, attached to load-bearing component 102, into second sleeve 114b of waist-belt 106. Of course, the insertion steps may, in the alternative, be performed sequentially, rather than simultaneously if time is not a factor. Once wing-ends 202a and 202b have been fully inserted into sleeves 114a and 114b, then complementary parts 108a and 108b of quick-disconnect mechanism 108 located on respective wing ends 202a, 202b and belt ends 304a, 304b must be aligned. Upon alignment of complementary parts 108a and 108b, the respective quick-disconnect mechanisms 108 engage, and remain so engaged until release.

Further provided is a method for quickly disconnecting a load or a portion of a load which in operation is borne by a load-bearing component, the interconnection member, and the waist-belt. Upon completion of the method, the load-bearing component and interconnection member remain affixed to one another, yet are separated from the waist belt, which in operation remains on the operator. The method of quickly disconnecting a load-bearing component includes at least the following steps: disengaging the at least one quick-disconnect mechanism, so that all quick-disconnect mechanism are disconnected, removing all of the one or more interconnection member(s) from the sleeve into which each had been inserted, and discarding the attached load-bearing component and interconnection member from the waist-belt. This method utilizes the quick-release weight distribution device, as described above.

In at least one embodiment, the method includes simultaneously disengaging at least one quick-disconnect mechanism 108, presently connected and attaching waist-belt 106 to interconnection member 104 which is in turn connected to load-bearing component 102b, by separating complementary parts 108a and 108b of at least one mechanism 108. Upon disengaging quick-disconnect mechanism 108, wing-ends 202a and 202b are pulled through sleeves 114a and 114b respectively, in a direction away from belt ends 304a and 304b and towards central section 306. Once wing-ends 202a and 202b have been completely removed from sleeves 114a and 114b into which they had been inserted, interconnection member 104 may be discarded. In the alternative, throughout the performance of the method, interconnection member 104 remains attached to load-bearing component 102.

Of course, the disengagement and removal steps may, in the alternative, be performed sequentially, rather than simultaneously if time is not a factor.

Advantageously, critical tactical gear attached to waist-belt 106 is thus retained, even upon completion of the method of releasing the load bearing and interconnection components.

The methods described above permit an operator to quickly (1) attach and distribute, or (2) detach, a load in a minimal number of steps and with distraction from the operator's surroundings, all while retaining critical gear on a waist belt—particularly advantageous in the heat of combat, when distraction or delay can lead to the loss of an operator's life. Further, the device, system and methods allow an operator to quickly replace a load-bearing component customized for one purpose with a load-bearing component customized for another purpose, thus permitting greater flexibility for accomplishing differing tactical objectives when situational needs vary.

While the foregoing specification is described with regard to certain preferred embodiments, and many details have been set forth for the purpose of illustration, it will be apparent to those skilled in the art that the invention is subject to various modifications and additional embodiments, and that certain of the details described herein can be varied considerably without departing from the spirit and scope of the invention. Such modifications, equivalent variations and additional embodiments are also intended to fall within the scope of the appended claims.

What is claimed is:

1. A weight-distribution and load release device, comprising:
    a waist-belt having:
    a first end with a first quick-release attachment mechanism;
    a second end with a second quick-release attachment mechanism; and
    a closure device having a first closure part at the first end of the waist-belt, reversibly attachable to a second closure part at the second end of the waist-belt;
    an interconnection member having:
    a first quick-release attachment mechanism reversibly mated to the first quick-release attachment mechanism of the waist-belt;
    a second quick-release attachment mechanism reversibly mated to the second quick-release attachment mechanism of the waist-belt;
    a load-bearing component having a connector section receiving the interconnection member and positioned between a first end of the interconnection member and a second end of the interconnection member;
    a first sleeve affixed to the first end and receiving the interconnection member between the first quick-release attachment mechanism and the connector section; and
    a second sleeve affixed to the second end and receiving the interconnection member between the second quick-release attachment mechanism and the connector section.

2. The weight-distribution and load release device of claim 1, wherein the waist-belt further comprises at least one accessory-attachment section.

3. The weight-distribution and load release device of claim 1, wherein a connector section of the interconnection member comprises one part of a coupling mechanism.

4. The weight distribution and load release device of claim 3, wherein the load-bearing component comprises one part of a coupling mechanism.

5. The weight distribution and load release device of claim 4, wherein the one part of the coupling mechanism of the connector section is reversibly mated to the one part of the coupling mechanism of the load-bearing component.

6. A weight distribution and load release system comprising:
- a load-bearing component having a weight-transfer nexus,
- a waist-belt having a closure device for securing the belt in a closed loop and a pair of sleeves affixed to a first end and second end respectively;
- an interconnection member received by the pair of sleeves and the weight-transfer nexus between the pair of sleeves, the interconnection member connecting the load-bearing component to the waist-belt and positioned between the waist-belt and the load-bearing component;
- the weight-transfer nexus configured for reversibly engaging the load-bearing component with the interconnection member and for redistributing at least a portion of the weight of the load-bearing component to the interconnection member; and
- at least one mated, reversible quick-release attachment mechanism configured for reversibly securing the interconnection member to the waist-belt and for redistributing at least the portion of the load from the interconnection member to the waist-belt.

7. The weight-distribution and load release system of claim 6, wherein the interconnection member further comprises a first quick release end and a second quick release end.

8. The weight-distribution and load release system of claim 7, wherein the pair of sleeves comprise:
- an affixed first sleeve and an affixed second sleeve,
- wherein the affixed first sleeve is configured to accept an insertion of and secure of the first quick-release end of the interconnection member, and the affixed second sleeve is configured to accept an insertion of and secure of the second quick-release end of the interconnection member.

9. The weight-distribution and load release system of claim 6, wherein the waist-belt further comprises a modular expansion mechanism for attaching accessories thereto.

10. The weight-distribution and load release system of claim 6, wherein the interconnection member comprises one part of a coupling mechanism; and the load-bearing component comprises one part of a coupling mechanism; and wherein the one part of the coupling mechanism of the interconnection member is reversibly mated to the one part of the coupling mechanism of the load-bearing component.

* * * * *